United States Patent

Browning

[15] 3,696,245
[45] Oct. 3, 1972

[54] VIEWING SCREEN MECHANISM FOR ELECTRON MICROSCOPE

[72] Inventor: George William Browning, Gt. Chesterford, England

[73] Assignee: Associated Electrical Industries Limited, London, England

[22] Filed: April 28, 1970

[21] Appl. No.: 32,749

[30] Foreign Application Priority Data

June 17, 1969  Great Britain..........30,656/69

[52] U.S. Cl. ............................................250/49.5 E
[51] Int. Cl..........................H01j 37/26, G01n 23/00
[58] Field of Search ...............250/49.5 A, 49.5 E, 66

[56] References Cited

UNITED STATES PATENTS 3,529,154   9/1970   Bowwmeester...........250/49.5

2,356,963   8/1944   Young....................250/49.5

FOREIGN PATENTS OR APPLICATIONS 927,283   5/1955   Germany.................250/49.5

Primary Examiner—William F. Lindquist
Attorney—Watts, Hoffmann, Fisher & Heinke

[57] ABSTRACT

An electron microscope comprising a microscope chamber having a viewing screen positioned within the chamber and mounted for movement to at least a first position away from a beam of electrons or a second position in which electrons passing through an object or specimen are intercepted by the viewing screen to thereby produce an image. A drive motor is coupled to the viewing screen for moving the screen to either the first or the second position.

12 Claims, 11 Drawing Figures

INVENTOR.
GEORGE W. BROWNING
BY
Watts, Hoffmann, Fisher & Heinke
ATTORNEYS

INVENTOR.
GEORGE W. BROWNING
BY
Watts, Hoffmann, Fisher & Heinke
ATTORNEYS

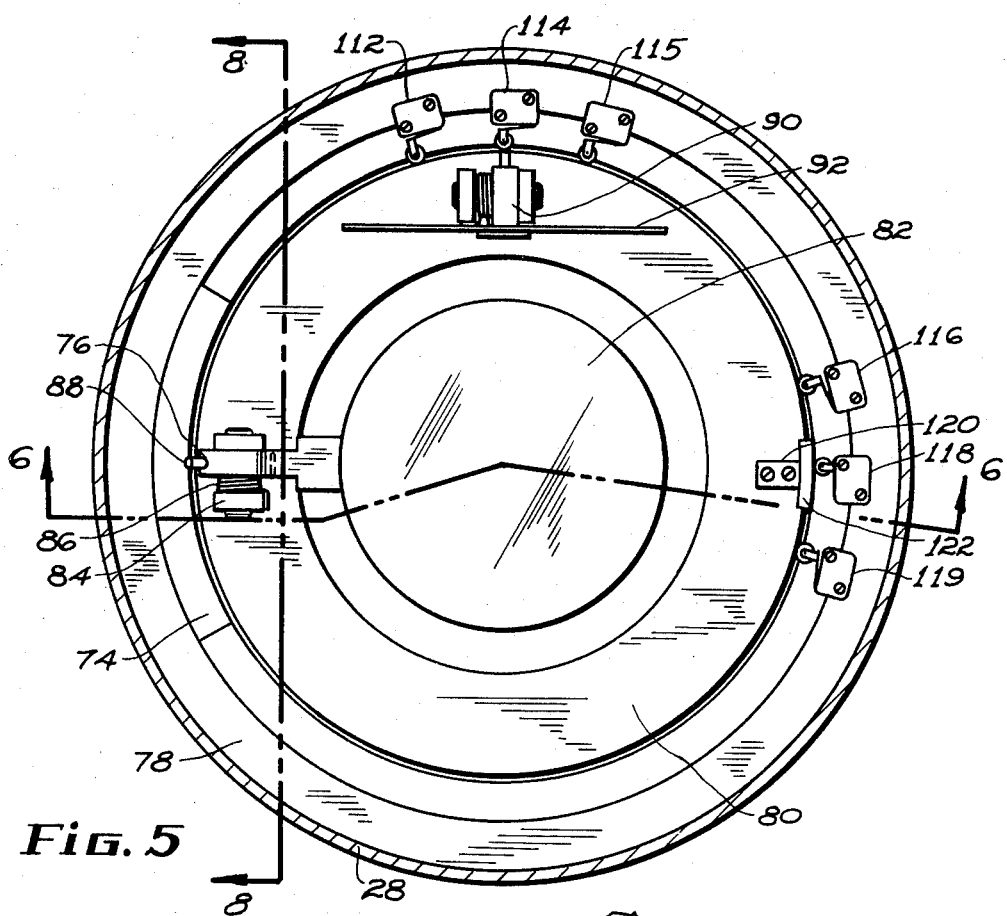
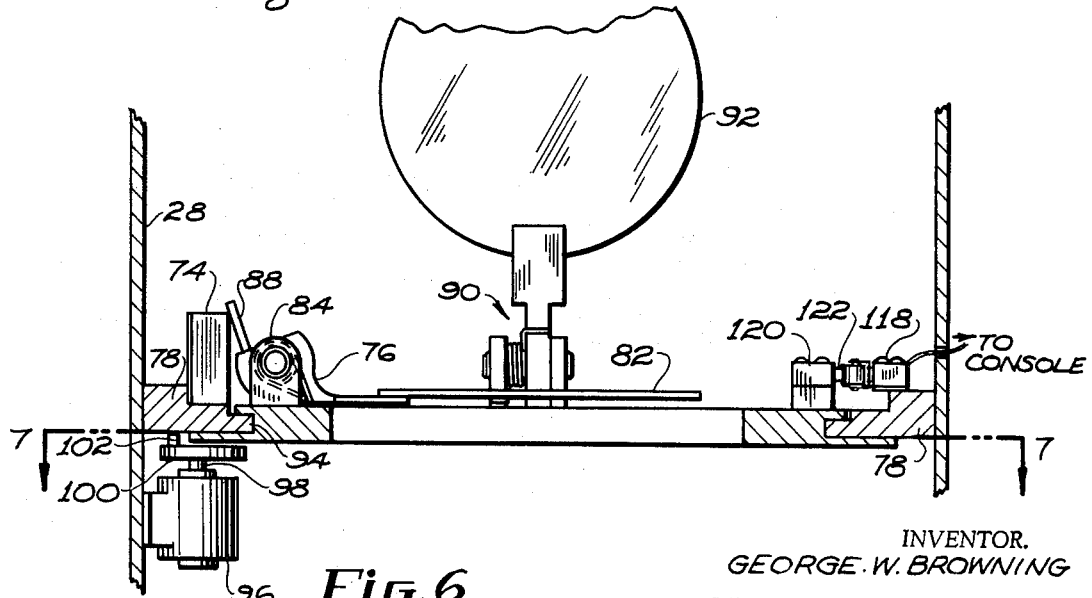

INVENTOR.
GEORGE W. BROWNING
BY
Watts, Hoffmann, Fisher & Heinke
ATTORNEYS

VIEWING SCREEN MECHANISM FOR ELECTRON MICROSCOPE

BACKGROUND OF THE INVENTION

This invention pertains to the art of electron microscopes, and more particularly, to a movable viewing screen for intercepting electrons which pass through an object, or specimen, to produce an image thereof.

Electron microscopes have included systems for varying the position of the various elements within the microscope chamber from a position outside of the chamber. For example, drive motors have been coupled to specimen support rods for varying the position of the support rod to thereby vary the position of a specimen with respect to an electron beam. It is desirable that the control of elements within the microscope chamber be accomplished without a loss of the vacuum which must be maintained in the chamber during the operation of the microscope.

In electron microscopes, it is frequently desirable to position an optical viewing screen so that electrons passing through an object, or specimen, strike the surface of the screen to thereby produce an image representative of the object. These viewing screens are generally coated with a phosphor material. Generally, a viewing window extends through the side of the microscope chamber so that the image produced on the viewing screen may be viewed from a position outside of the chamber.

It is also frequently necessary to position a photographic plate so that the electrons which pass through the object strike the photographic plate to thereby produce a photographic image representative of the object. It is desirable that the optical viewing screen be arranged so that the screen may be moved to either a first position so as not to obstruct the photographic plate or to a second position in which the screen is positioned to intercept electrons passing through the object to be viewed.

It is also desirable that the viewing screen be arranged so that the screen may be positioned either in a horizontal position, or an oblique position with respect to the electron beam. When the screen is positioned in the oblique position, the screen extends in a plane normal to the viewing direction through an optical window extending through the side of the chamber; however, in this oblique position the image is somewhat distorted since the beam of electrons strike the screen at an oblique angle.

When the screen is moved to a horizontal position, it will be normal to the direction of the beam of electrons and in this position the image presented on the screen will not be distorted. In this position, however, the screen will be viewed from an oblique angle which is frequently undesirable.

During the operation of electron microscopes, it is necessary that a vacuum be maintained within the microscope, therefore it is desirable that the position of elements within the microscope chamber be varied from a position outside of the chamber. Thus, it is also desirable that the position of the viewing screen be controlled from a point external of the microscope chamber.

SUMMARY OF THE INVENTION

The present invention is directed toward an electron microscope having a plurality of viewing screens which may be moved to either the first position away from a beam of electrons which pass through an object specimen, or to a second position in which the electrons pass through the object are intercepted by the viewing screen, thereby overcoming the noted disadvantages, and others, of such previous electron microscopes.

In accordance with one aspect of the present invention, the electron microscope includes a microscope chamber having a source of electrons positioned within the chamber, focusing means for directing the electrons into a beam of electrons, means for directing the electrons toward an object to be irradiated, object positioning means for positioning an object in the beam of electrons, and a viewing screen for intercepting the electrons, and a viewing screen for intercepting the electrons which pass through the object, to thereby produce an image. The viewing screen generally comprises an electron stimulated means positioned within the chamber, means for mounting the electron stimulated means for movement to either a first position away from the beam of electrons or to a second position in which electrons passing through the object are intercepted by the electron stimulated means, and drive means coupled between the motor means and the electron stimulated means for moving the electron stimulated means from the first position to the second position.

In accordance with another aspect of the present invention, the electron microscope includes a plurality of viewing screens, each having a phosphor coating and different thickness and which may be selectively moved to either a first position away from the beam of electrons or to a second position in which electrons passing through an object are intercepted by the selected viewing screen.

In accordance with still another aspect of the present invention, the electron stimulated means may be selectively moved to either a first position or a plurality of other positions in which the electrons passing through an object are intercepted by the electron stimulated means at different angles.

In accordance with still another aspect of the present invention, the electron microscope includes indicator means for providing an indication of the position of the viewing screen with respect to the beam of electrons.

The primary object of the present invention is to provide an electron microscope having a viewing screen which may be moved to either a first position or a second position.

Another object of the present invention is to provide an electron microscope with a viewing screen which may be moved from a position away from a beam of electrons to a position in which the viewing screen intercepts electrons passing through an object or specimen to be viewed.

Another object of the present invention is to provide an electron microscope having a viewing screen which may be moved to a position perpendicular to the beam of electron or to a position normal to the viewing direction through an optical window which extends through the microscope chamber.

A further object of the present invention is to provide a viewing screen mechanism which includes a plurality of electron stimulated plates each of which may be selectively moved to either a first position away from a beam of electrons or to a second position in which electrons passing through an object are intercepted by the plate.

A still further object of the present invention is to provide an electron microscope having a movable viewing screen in which means are provided for displaying an indication of the position of the screen.

BRIEF DESCRIPTION OF THE DRAWINGS

These and other objects and advantages of the invention will become apparent from the following description of a preferred embodiment of the invention as read in connection with the accompanying drawings in which:

FIG. 5 is a sectional view of the viewing screen of FIG. 4, taken along lines 5—5;

FIG. 6 is a sectional view of the viewing screen of FIG. 5 taken along lines 6—6;

DESCRIPTION OF THE PREFERRED EMBODIMENT

Figure 1:
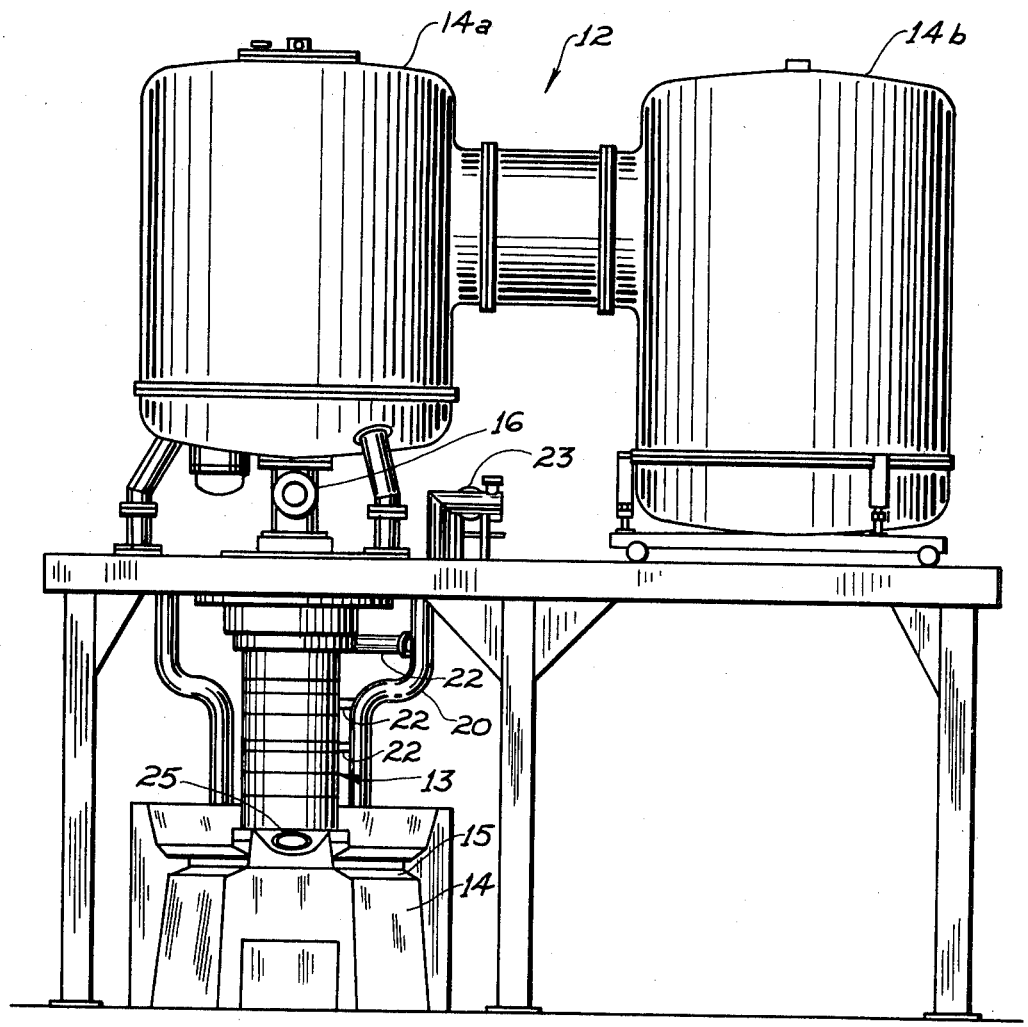
FIG. 1 is an elevational view of a high voltage electron microscope of the present invention.
Figure 2:
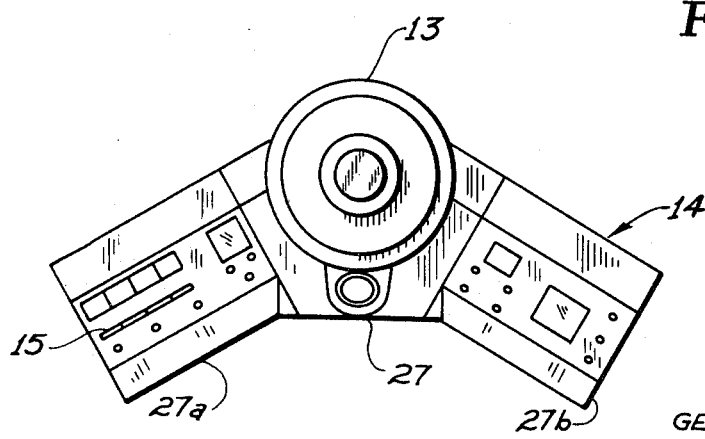
FIG. 2 is a top plan view of the microscope column.

Referring now to the drawings, FIGS. 1 and 2 illustrate one orientation of the components of a high voltage electron microscope system 10. The microscope 10 has a high voltage electron source 12 positioned above a microscope column 13 and a control console 14. The electron source 12 includes a pair of pressurized tanks 14a, 14b containing respectively a high voltage accelerator and a high voltage generator which are coupled to an intermediate section 16 positioned above the microscope column 13. The column includes a housing assembly 18 composed of a stack of tubular members which define an analytical chamber within the column.

The electron source 12 generates a very high potential, i.e., one million volts. This potential, when applied to the electron gun at the head of the accelerator and contained within it but not shown, causes electrons to be propelled through the analytical chamber within the microscope column 13 with very high energy.

A vacuum manifold 20 having a plurality of cylinders 22 is coupled to the column 13. The manifold 20 is also coupled to a vacuum pump 23 so that the entire chamber within the microscope column 13 may be evacuated.

In the arrangements of FIGS. 1 and 2 the control console 14 is positioned in juxtaposition to the column 13. The console includes a panel 15, and is positioned with respect to the microscope so that an operator may readily observe an image of the specimen through a viewing window 25.

FIG. 2 illustrates in more detail the construction of the control console 14 and its orientation with respect to the column which includes a center console section 27 and a pair of wing console sections 27a, 27b. The console sections 27, 27a, 27b are positioned in juxtaposition to the column 13, and the angle forwardly with respect to the center section. Thus, rather than being aligned, each console wing section is at an angle of about 25° with the center section. This facilitates operator control and also maximizes access to the microscope column 13 for service, adjustments, insertion of specimens, and the like. In addition, for access to substantially the entire column 13, the wing consoles 27a, 27b may be readily removed.

Figure 3:
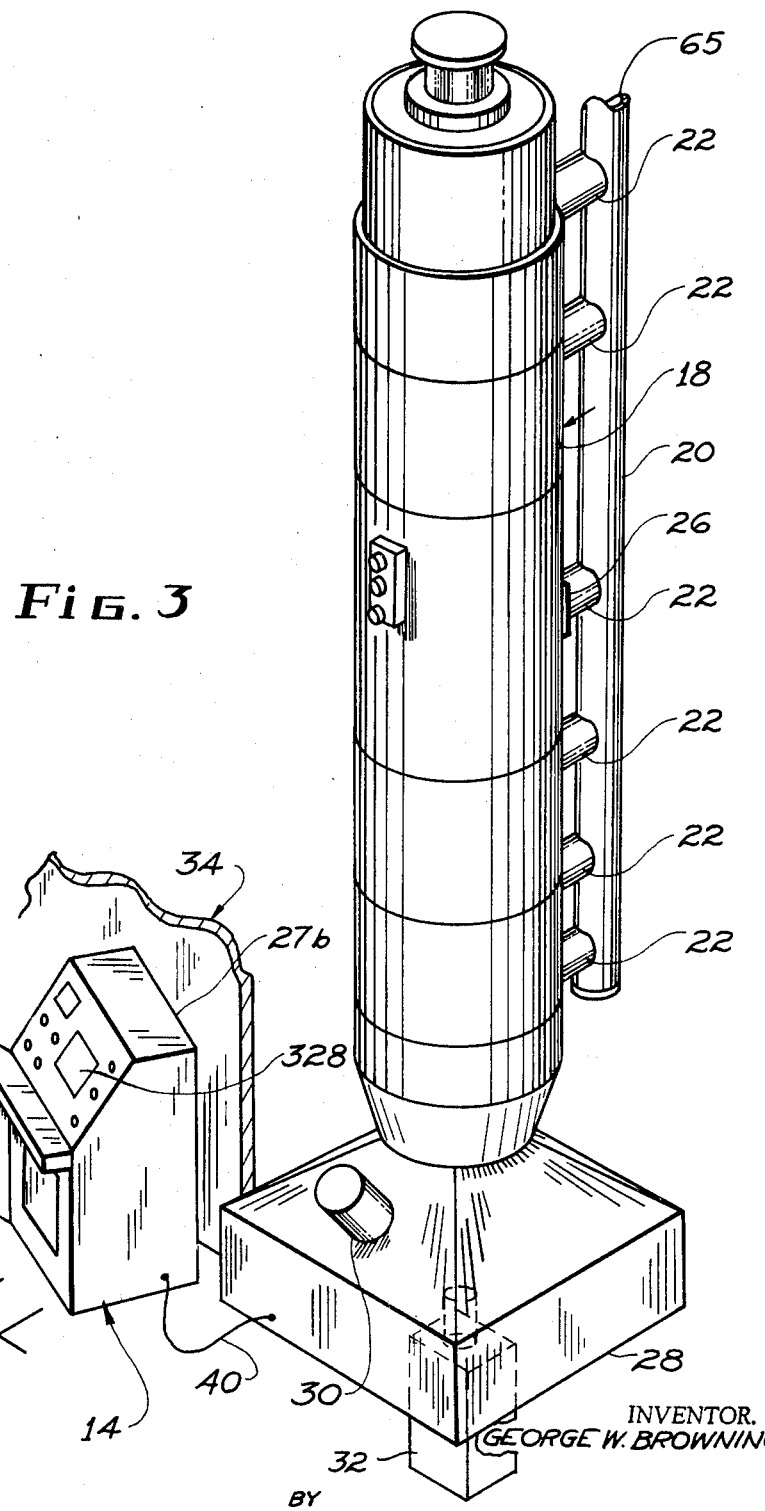
FIG. 3 is a perspective view of the microscope column.

FIG. 3 illustrates another arrangement of the components of the electron microscope system 10. The control console 14 is positioned in spaced relationship with respect to the microscope column 13. A protective screen 34 is disposed between the electron microscope column 13 and the control console 14 for intercepting penetrating X-rays and gamma rays, in order to protect the operating personnel. The screen 34 takes the form of a wall of material which will absorb X-rays generated by the microscope during studies.

The column 13 includes a viewing chamber assembly 28. The viewing assembly supports the housing assembly 18. The viewing assembly has a viewing window 30 through which an operator may view a specimen image. For remote viewing of a specimen image, the viewing assembly includes a television camera 32 positioned to view an image of the specimen.

Figure 4:
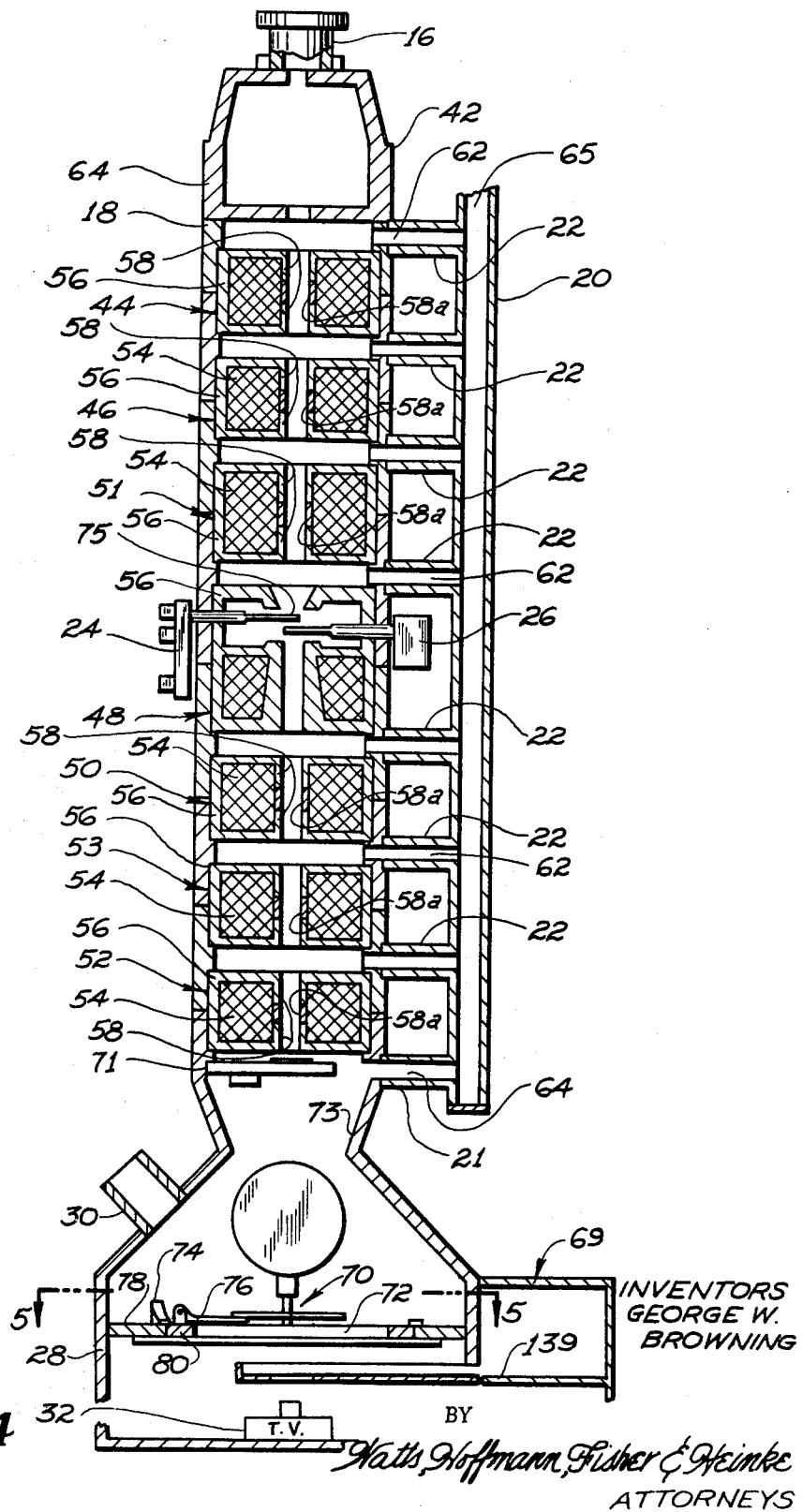
FIG. 4 is a sectional view of the microscope column illustrating the viewing screen mechanism of the present invention.
Figure 7:
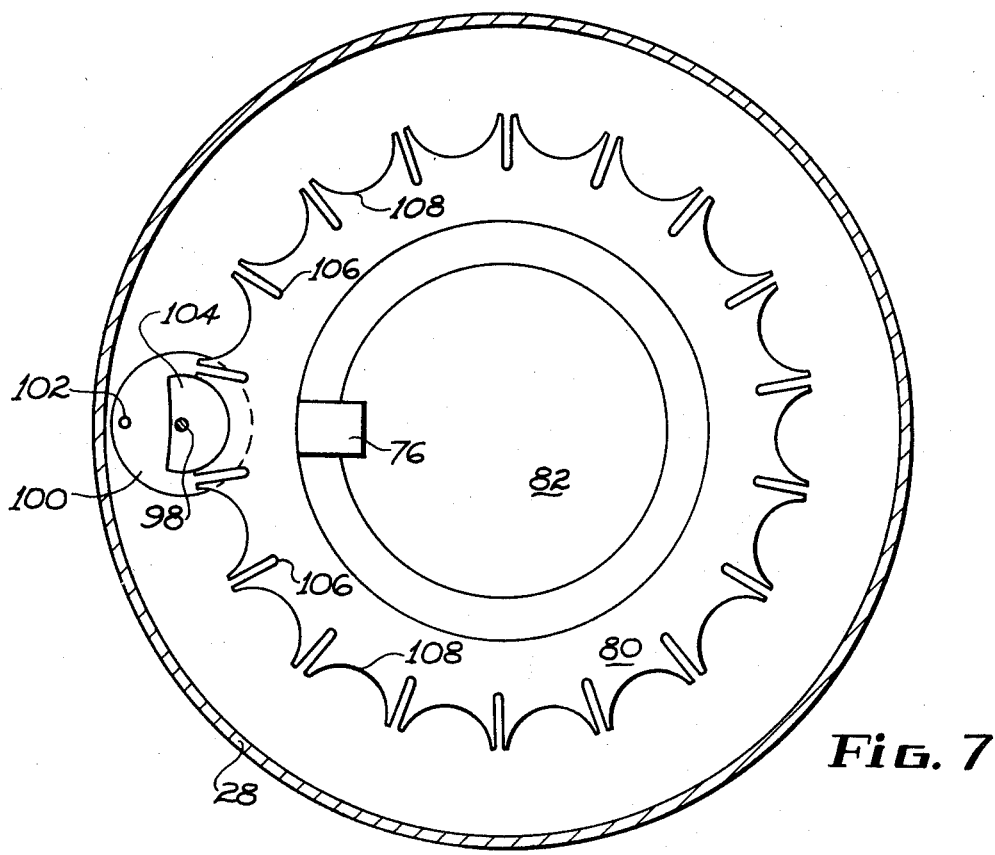
FIG. 7 is a sectional view of the viewing screen of FIG. 6, taken along lines 7—7.
Figure 8:
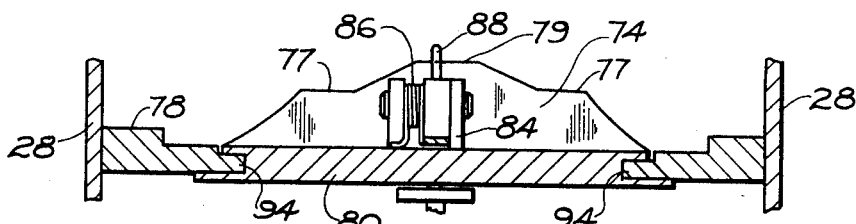
FIGS. 8 through 10 are sectional views of various positions of the screen mechanism as illustrated in FIG. 5.

FIG. 4 illustrates in more detail the construction of the microscope column 13. The upper one of the tubular members defines a bore 42 extending therethrough. The electron accelerator and generator 16 is positioned on top of the housing assembly in communication with the bore 42.

A pair of condenser lenses 44, 46; a set of deflector coils 51; an objective lens 48; and three projector lenses 50, 52, 53 are respectively positioned within the housing assembly 18. Each of the lenses 44, 46, 48, 50, 52 and 53 generally includes a magnetic winding 54, supported by a frame member 56 constituting the magnetic circuit. Each winding 54 is positioned around two pole pieces 58. The pole pieces define a lens gap 58a for directing and focusing a flow of electrons through the microscope.

A specimen positioning control assembly 24 is mounted on one side of housing assembly 18. Another specimen positioning control assembly is provided 90° from the assembly 24, but not show. The specimen assemblies are identical with one controlling X and the other Y adjustment of a specimen. An aperture positioning assembly 26 is mounted on the same tubular member of the assembly 18, directly below the specimen control assembly 24 and shown diametrically opposite the specimen assembly 24.

Communication between the analytical chamber within the housing assembly 18 and the vacuum manifold 20 is provided through a plurality of manifold connections 22 and a plurality of passages 62 extending through the housing members. The viewing chamber is connected to the manifold by a manifold connection 21 and a passage 64 through the wall of the viewing chamber assembly 28. Thus, the entire column 10 may be evacuated by applying a vacuum at the inlet 65 of the manifold 20.

A screen mechanism 70 is positioned within viewing chamber assembly 28 for viewing an image of a specimen under investigation. Screen mechanism 70 is positioned near the base of the viewing chamber assembly. The screen mechanism includes a support ring 78 with a cam 74 mounted on it. A rotatable ring 80 when driven round positions a viewing plate support arm 76 to either a vertical position, an intermediate position, or a horizontal position.

A shutter mechanism 71 is mounted at the base of the housing assembly 18 immediately above an upper section 73 of the viewing chamber assembly 28. The shutter mechanism is positioned beneath projector lens 52.

The shutter mechanism, upon being opened, allows the passage of a beam of electrons generated by the electron source 12. The electron beam is focused by the condenser lenses 44, 46 onto the specimen 75. The electron beam leaving the object 75 contains an image which is magnified by lenses 50, 52 and 53 and is then projected onto the screen or film in the viewing chamber 28 when the shutter is open. Upon closure of shutter mechanism 71, the beam of electrons is interrupted and prevented from passing into viewing chamber 28.

A film mechanism 69 is mounted on the viewing chamber assembly 28 and shown as mounted to the rear thereof and extending into the viewing chamber. The film mechanism 69 includes structure to move a film plate into a position beneath the screen mechanism 70 for recording images contained in the beam of electrons.

FIGS. 5 through 10 illustrate in more detail the construction of screen mechanism 70. A support rim 78 is circumferentially supported by walls of the viewing chamber assembly. The rim 78 supports the cam 74. A rotatable ring 80 is mounted within support rim 78 for supporting the support arm 76 and for rotating the arm 76 with respect to the cam 74.

Figure 9:
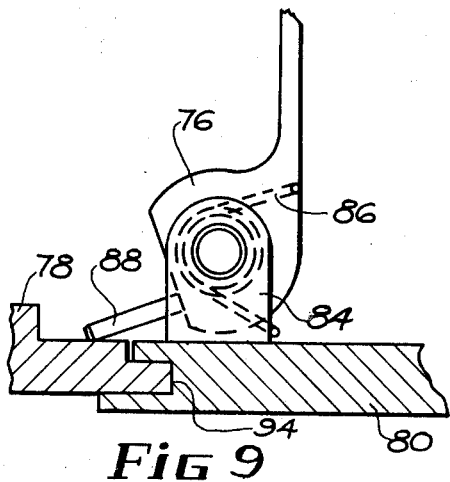
Figure 10:
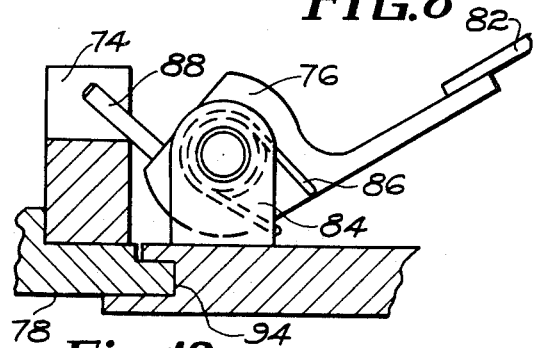
Figure 11:
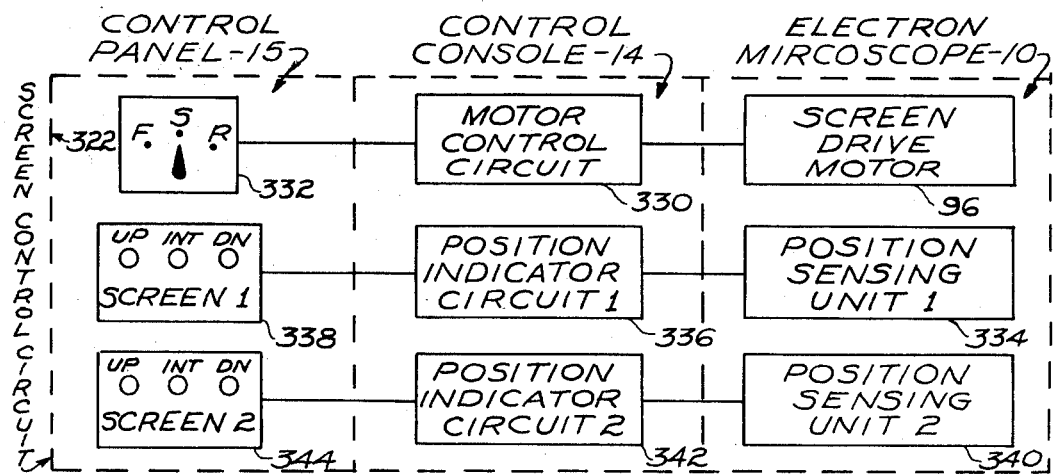
FIG. 11 is a block diagram illustrating the control circuitry for the viewing screen mechanism as shown in FIG. 5.

The support arm 76 supports a viewing plate 82 which is covered with a phosphor material, so as to be stimulated by the beam of electrons to produce an image of the specimen 75. The viewing plate 82 is pivotally mounted on a bracket 84 for movement to either a vertical position as shown in FIG. 9, an intermediate position as shown in FIG. 10, or a horizontal position as shown in FIG. 6. The viewing plate 82 is biased by a spring 86 to the vertical position. The support arm 76 includes a projection 88 which, upon coaction with the cam 74, forces support arm 76 into the intermediate and horizontal positions against the action of the spring 86. The cam 74 extends over an angle of approximately 60° around the annular support rim 78. It includes a pair of spaced intermediate cam surfaces 77 and a central surface 79, FIG. 8.

When the support arm 76 is moved to either of the flattened surfaces 77, the viewing plate 82 is moved to the intermediate position and as projection 88 is moved to the central surface 79, the plate 82 is forced downward into the horizontal position.

When the rotatable ring 80 is rotated approximately 90° in a counterclockwise direction, as viewed in FIG. 5, a second plate support cam 90 comes in contact with cam 74 to thereby drive viewing plate 92 into an intermediate or a horizontal position.

Thus, a selected one of at least two screen plates may be positioned to present an image of the specimen 75 and, alternatively, both of the plates 82, 92 may be moved to the vertical position to allow the beam of electrons to pass to the film mechanism 69 on T.V. camera 32. When one of the viewing screens is horizontal, or in one intermediate position, the screen is positioned for optical viewing.

The rotatable ring 80 is supported by and rides in a tongue-and-groove arrangement 94 on the annular support rim 78, and is driven by a motor 96, FIG. 6. The drive motor 96 is electrically connected to the control console 14 and includes a shaft 98 which is coupled to a drive disc 100. The drive disc 100 includes a pin 102 positioned between the center of disc 100 and the outer edge.

An arcuate shaped portion 104 of disc 100 engages a series of corresponding concave portions 108 on the ring 80. Thus, as disc 100 is rotated, the pin 102 and the arcuate shaped portion 104 successively engage slots 106 and concave portions 108, respectively, and through this Geneva arrangement cause ring 80 to be rotated about a vertical axis as viewed in FIG. 4. The Geneva motion is substantially of a known construction corresponding to the construction shown and described in connection with the ensuing description of the aperture positioning mechanism 26.

In order to provide a visual indication as to the position of viewing plate 82, a plurality of switches 116, 118, 119 are positioned at selective intervals along the support rim 78. A bracket 120 is mounted on the rotatable ring 80. The bracket has a switch control projection 122 positioned to actuate the switches 116, 118, 119 as the ring 80 is rotated. Thus, as an example, when viewing plate 82 is in the horizontal position of FIG. 7, the switch control projection 122 closes the switch 118 to thereby energize suitable circuitry to provide a "Down" indication at the control panel 15 for the plate 82.

When the viewing plate 82 is in the intermediate position, i.e., screen arm projection 88 engages either of the cam surfaces 77, the corresponding switch 116, 119 will be actuated to energize suitable circuitry to provide an "Intermediate" indication on control panel 15. Finally, when plate 82 is in the vertical position, i.e., screen arm projection 88 is positioned off of the camming surfaces 74, the actuating projection 122 is moved away from switches 116, 118, 119 thereby causing these switches to remain in the normally open position. With switches 116, 118, 119 in the open position, an "Up" indication is presented on control panel 15.

In a similar manner, as plate 92 is moved to the intermediate and horizontal positions, a selected one of a plurality of switches 112, 114, 115 is actuated to provide an indication on the control panel 15 of the position of plate 92.

The screen control circuit 322 is comprised of the screen drive motor 96 coupled through a motor control circuit 330 to a three-position motor control switch 322. The three-position switch is mounted on the control panel 15. Thus, when the switch 332 is moved to a "FORWARD" position, the screen drive motor 96 is energized to lower a desired screen plate into a horizontal position, raise the desired screen plate to a vertical position, or position the screen plate to an intermediate position.

The screen control circuit also includes a position sensing unit 334 which is comprised of the switches 116, 118, 119. These switches 116, 118, 119 are connected through a position indicator circuit 336 to a position indicating device 338 having indicating lamps to represent an "UP" position, an "INTERMEDIATE" position and a "DOWN" position. Similarly, a second sensing unit 340, which includes switches 112, 114, 115, is coupled through a position indicator unit 342 to a second position indicating device 344 also having an "UP" indicator lamp, an "INTERMEDIATE" indicator lamp, and a "DOWN" indicator lamp. Thus, when the appropriate switch 112, 114, 115, 116, 11 are actuated, a visual indication is presented on the appropriate indicator device 338, 344 to indicate the position of the screen plates 82, 92. Thus, the screen plate 82 may be moved to a horizontal position, i.e., perpendicular to the beam of electrons, an intermediate position, i.e., normal to the direction of viewing through the viewing window 30, and vertical, i.e., away from the beam of electrons. Similarly, viewing plate 92, having a different phosphor coating, for example a thicker coating, may be selectively positioned either horizontally, vertically or in an intermediate position, or a transparent screen coated with phosphor for viewing images from below the microscope.

Although the invention has been shown in connection with preferred embodiments, it will be readily apparent to those skilled in the art that various changes in form and arrangement of parts may be made to suit requirements without departing from the spirit and scope of the invention as defined by the appended claims.

Having now described my invention, I claim:

1. In an electron microscope comprising a microscope column having an evacuatable chamber therein and a source of electrons for directing electrons into said chamber:
   a. structure defining a specimen positioning station;
   b. focusing means for directing electrons from said source into a beam of electrons and directing said electrons along a path toward said station;
   c. the structure including specimen positioning means for positioning a specimen at the station and in such beam of electrons so that at least some of the electrons pass through said specimen;
   d. support means positioned within said chamber and mounted for rotation in a plane substantially perpendicular to said path of electrons;
   e. arm means mounted on said support means for rotation therewith, said arm means being pivotally mounted for movement between a first position generally parallel to said plane of rotation and a second position generally perpendicular to said plane;
   f. electron stimulated means carried by said arm means for movement therewith, said electron stimulated means being positioned in the path of said beam of electrons when said arm means is positioned in said first position, and being positioned generally outside the path of said beam of electrons when said arm means is positioned in said second position;
   g. cam means carried by said chamber and adapted to engage said arm means during rotation of said support means to selectively position said arm means to move said electron stimulated means into and out of said beam of electrons; and,
   h. drive means connected to said support means for rotating said support means to selectively position said electron stimulated means.

2. The electron microscope of claim 1 wherein a plurality of arm means are mounted on said support means, each of said arm means carrying a separate electron stimulated means and being adapted to engage said cam means to move any selected one of said electron stimulated means into said beam of electrons.

3. The electron microscope of claim 1 wherein said drive means comprises an electric motor responsive to electric signals applied thereto to rotate said support means.

4. The electron microscope of claim 3 wherein said drive means additionally comprises indexing means interposed between said motor and said support means to rotate said support means between predetermined angular positions.

5. The electron microscope of claim 4 wherein said cam means is so configured as to position said arm means at at least one intermediate position between said first and second positions, as well as at said first and second positions, when said support means is positioned at said predetermined angular positions.

6. In an electron microscope comprising a microscope column having an evacuatable chamber therein and a source of electrons for directing electrons into said chamber:
   a. focusing means for directing electrons from said source into a beam of electrons and directing said electrons along a path toward an object to be irradiated;
   b. object positioning means for positioning a said object in a said beam of electrons so that at least come of the electrons pass through a said object;
   c. electron stimulated means for presenting an image of said object;
   d. annular support means mounted for rotation in a plane substantially perpendicular to said beam of electrons;
   e. a support arm pivotally mounted on said annular support means for supporting said electron stimulated means and including a projection extending therefrom;
   f. cam means mounted on said chamber adjacent said annular support means for cooperation with said projection on said support arm; and,
   g. drive means including an electric motor responsive to electric signals applied thereto to rotate said annular support means relative to said cam means to selectively move said electron stimulated means between a first position generally in the plane of said annular support means in the path of said beam of electrons and a second position generally perpendicular to said plane out of the path of said beam of electrons depending on the interaction between said cam means and said projection on said support arm.

7. An electron microscope in accordance with claim 6 comprising a plurality of electron stimulated means and a like plurality of support arms pivotally mounted on said annular support means for supporting said electron stimulated means.

8. An electron microscope in accordance with claim 6 wherein said drive means comprises an indexing mechanism coupling said electric motor to said annular support means for rotating said annular support means between predetermined angular positions.

9. An electron microscope in accordance with claim 6 additionally including biasing means biasing said support arm to said second position, the interaction of said cam means and said projection being operative to overcome the action of said biasing means to move said support arm to said first position.

10. An electron microscope in accordance with claim 6 wherein said annular support means is mounted for rotation by means of its outer edge, and said cam means is secured radially outwardly from and substantially adjacent to said outer edge.

11. An electron microscope in accordance with claim 6 including electrical signal means to electrically signal predetermined angular positions of said annular support means.

12. An electron microscope in accordance with claim 11 additionally comprising:
  a. a control console in spaced relationship with the microscope column;
  b. actuator means mounted on said control console to transmit said electric signals to said electric motor; and,
  c. indicator means mounted on said control console and electrically connected to said electrical signal means to indicate when said annular support means is in one of said predetermined angular positions.

* * * * *